United States Patent
Chang

(10) Patent No.: US 7,193,944 B2
(45) Date of Patent: Mar. 20, 2007

(54) INFORMATION RECORDING DEVICE AND METHOD OF THE SAME

(75) Inventor: Andrew C. Chang, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 429 days.

(21) Appl. No.: 10/610,656

(22) Filed: Jul. 2, 2003

(65) Prior Publication Data

US 2004/0042362 A1 Mar. 4, 2004

(30) Foreign Application Priority Data

Sep. 2, 2002 (TW) .............................. 91119917 A

(51) Int. Cl.
*G11B 7/0045* (2006.01)
(52) U.S. Cl. .................................. 369/47.55
(58) Field of Classification Search ...................... None
See application file for complete search history.

(56) References Cited

U.S. PATENT DOCUMENTS

| | | | | |
|---|---|---|---|---|
| 6,205,102 B1 * | 3/2001 | Spruit | ..................... | 369/59.11 |
| 6,853,609 B2 * | 2/2005 | Kusumoto et al. | ....... | 369/44.29 |

\* cited by examiner

*Primary Examiner*—William Korzuch
*Assistant Examiner*—Joseph Haley
(74) *Attorney, Agent, or Firm*—Troxell Law Office PLLC

(57) ABSTRACT

The present invention relates to an information recording method to write a digital information file onto an information recording medium. The digital information file comprises a plurality of digital data and the information recording medium comprises a plurality of predetermined recording units which are arranged sequentially on said information recording medium from an inner area to an outer area in order to write the plurality of digital data on the digital information file. The inner area of the information recording medium has a data recording start area, and the data recording start area comprises a first start recording unit, where recording the plurality of digital data of digital information file supposed to start. This information recording method is starting from said first start recording unit to derive a second start recording unit through a predetermined counting procedure. Then starting from said second start recording unit rather than from said first start recording unit, write said digital data onto said information recording medium, wherein there are at least a plurality of recording units between said second start recording unit and said first start recording unit.

17 Claims, 4 Drawing Sheets

INFORMATION RECORDING DEVICE AND METHOD OF THE SAME

FIELD OF THE INVENTION

The present invention relates to an information recording method. And more particularly, the present invention indicates an information recording method to write a digital information file onto an information recording medium.

BACKGROUND OF THE INVENTION

A CD drive is an information recording device in the prior art, used to record a digital information file onto an information recording medium, such as a compact disk (CD). Take the circle shaped CD, for example. It is known that when using a high speed CD drive to record digital information on CD, the high speed CD drive is to rotate the CD in a fixed rotating speed, and the recording method starts recording the digital information file sequentially from a start recording unit comprised in the Lead-in Area in the inner part to the outer part of the CD.

Since the rotating speed of the CD is fixed, the writing speed in which the CD drive writes digital data on the outer part in the CD is higher than the writing speed in which the CD drive writes digital data on the inner part of the CD.

Typically, for a CD, the longest radius is 3 times as long as the shortest one. The speed in which the CD drive records or reads the most outer circle of the CD is about 3 times than the speed in which the CD drive records or reads the most inner circle of the CD.

Since the way that the CD drive writes the CD is to start from the start recording unit, and move from the inner circle to the outer circle. That is to start from a slower writing speed, and waste a lot of recording time.

The present invention is primarily to provide an information recording method to accelerate the speed in which the CD drive record a digital data on the CD.

SUMMARY OF THE INVENTION

It is the primary objective of the invention to provide an information recording method to record a digital information file onto an information recording medium. The digital information file comprises a plurality of digital data. The information recording medium comprises a plurality of predetermined recording units, arranged sequentially on the information recording medium from an inner area to an outer area in order to record the plurality of digital data on the digital information file. The inner area of the information recording medium has a data recording start area, or so called "Lead-in Area". The data recording start area comprises a first start recording unit, where recording the plurality of digital data of the digital information file supposed to start. This information recording method starts from the first start recording unit to derive a second start recording unit through a predetermined counting procedure. Then starting from the second start recording unit rather than from the first start recording unit records the digital data onto the information recording medium, wherein there are at least plural recording units between the second start recording unit and the first start recording unit.

According to the present invention, the information recording method can effectively accelerate the writing speed in which a CD drive writes digital data on a CD and further substantially accelerate the writing speed of a CD drive.

The advantage and spirit of the invention may be understood by the following recitations together with the appended drawings.

BRIEF DESCRIPTION OF THE APPENDED DRAWINGS

DETAILED DESCRIPTION OF THE INVENTION

This invention provides an information recording method to record a digital information file onto an information recording medium, wherein the digital information file comprises a plurality of digital data. The information recording method of this invention uses an information recording device to record the digital information file record on the information recording medium. The information recording device electrically connects to a computer. The computer comprises a data reading/writing software to control the information recording device recording or reading the digital data. The information recording medium can be a compact disc (CD) or a hard disc. The information recording device can be a compact disc (CD) drive or just a computer system.

Figure 1:
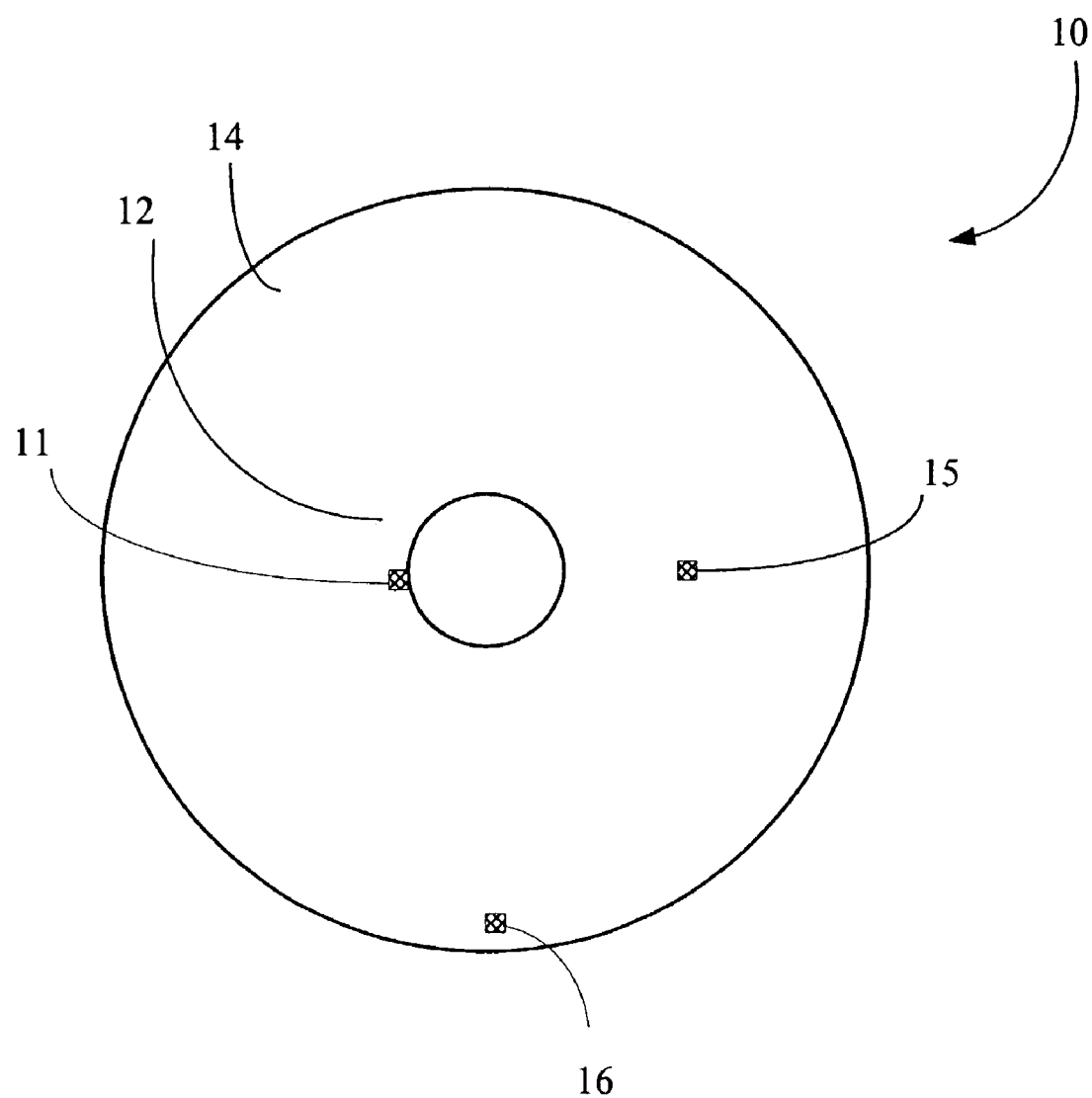
FIG. 1 shows a schematic diagram of a CD utilized in the information recording method of this invention.

Referring to FIG. 1, FIG. 1 shows a schematic diagram of a CD utilized in the information recording method of this invention. The CD 10 is circle shaped, comprising a plurality of circle recording grooves (not shown in FIG. 1) arranged in a helical way on the CD 10. In this prevention, the information recording medium can be a concentric circle recording groove. The recording units are distributed in the concentric recording grooves to record digital data.

The CD 10 comprises an inner area 12 and an outer area 14. The CD 10 comprises a plurality of predetermined recording units(not shown in FIG. 1) which are arranged sequentially on the helical recording grooves from an inner area to an outer area in order to record the plurality of digital data in the digital information file.

The inner area 12 has a data recording start area or so called a Lead-in Area(not shown in FIG. 1). The data recording start area comprises a first start recording unit 11 and stores a File Allocation Table (FAT). The first start recording unit 11 is where recording the plurality of digital data of the digital information file supposed to start. The FAT records associated information of a blank file and of a digital information file onto the FAT, so as to correctly access the digital information file later.

When the information recording method records a digital information file, it starts from the first start recording unit 11 to derive a second start recording unit 15 through a predetermined counting procedure. Then start from the second start recording unit 15 rather than from the first start recording unit 11 to record the digital data onto the CD 10. The CD 10 has a plurality of recording units enough to record all of the digital data of the digital information file. There are several blank recording units between the second start recording unit 15 and the first start recording unit 11.

According to an embodiment of this invention, the outer area 14 of the CD 10 comprises a last recording unit 16. The predetermined counting procedure is to count the number of the digital data in the digital information file. Then count forward from the last recording unit 16 to get the second start recording unit 15, thus all the digital data comprised in the digital information file can be recorded.

According to another embodiment, the predetermined counting procedure is to set an interval recording unit number. Counting the interval recording unit number of recording units from the first start recording unit 11, the recording unit right behind the first start recording unit 11 is the second start recording unit 15.

Figure 2:
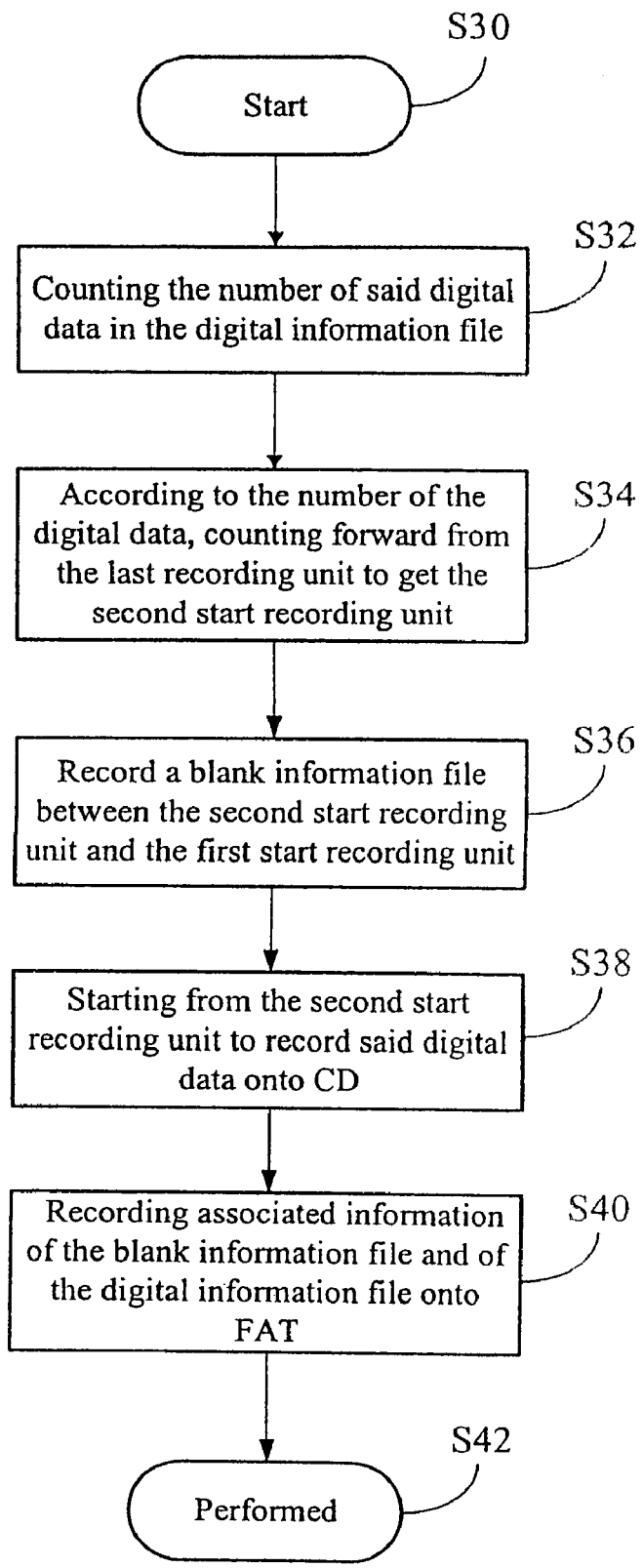
FIG. 2 is a flowchart showing recording information on the CD of FIG. 1 according to an embodiment of the present invention.

Referring to FIG. 2, FIG. 2 is a flowchart showing recording information on the CD 10 of FIG. 1 according to an embodiment of the present invention. According to an embodiment of this invention, the process related to record information by the information recording method in the CD 10 of FIG. 1 has the following steps:

STEP S30: Starting;

STEP S32: Determining the amount (e.g., bytes) of the digital data in the digital information file;

STEP S34: According to the amount of the digital data, counting forward from the last recording unit 16 to get the second start recording unit 15;

STEP S36: Skipping some units or recording a blank file between the second start recording unit 15 and the first start recording unit 11;

STEP S38: Starting from the second start to record unit 15 to record the digital data onto CD 10;

STEP S40: Recording associated information of the blank file and of the digital information file onto FAT;

STEP S42: Performed.

Figure 3:
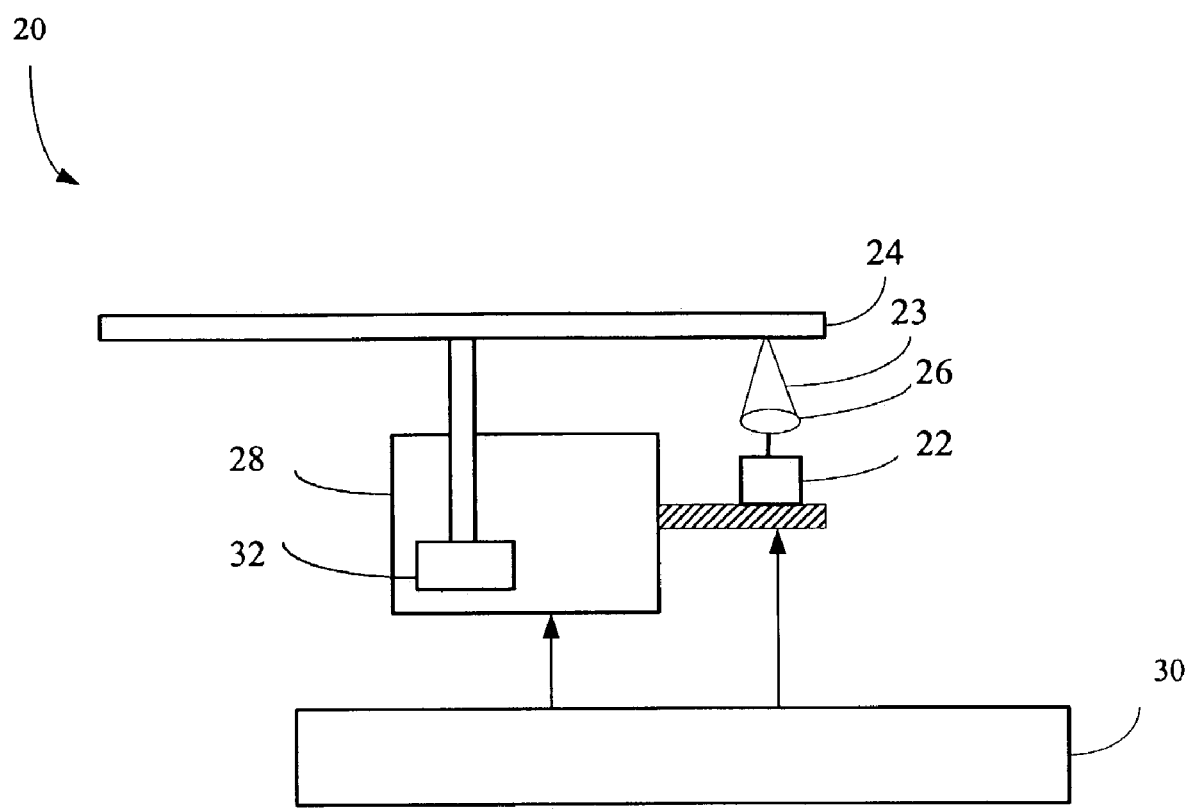
FIG. 3 shows a schematic diagram of a CD drive utilized in the information recording method of this invention.

Please refer to FIG. 3. FIG. 3 shows a schematic diagram of a CD drive 20 utilized in the information recording method of this invention. The CD drive 20 comprises a pickup head 22, a set of optical lenses 26, an actuator 28 and a controller 30. The pickup head 22 emits a light beam 23 to write the digital data onto the CD 30, and reads the digital data from the CD 24. The set of optical lenses 26 is used for focusing the light beam 23 emitted from the pickup head 22 to the CD 24, and focusing the light beam reflected from the CD 24 to the pickup head 22. The pickup head 22 will receive the reflected light beam so as to facilitate the reading later.

The actuator 28 actuates the pickup head 22, the set of optical lenses 26 and the CD 24 to write or read digital data. The actuator 28 comprises a spindle motor module 32 to rotate the CD 24 in a rotating speed to let the pickup head 22 write digital data on the CD 24. The writing speed in which the pickup head 22 writes digital data on the outer area in the CD 24 is higher than the writing speed in which the pickup head 22 writes digital data on the inner area in the CD 24.

The controller 30 is used for controlling the pickup head 22, the set of optical lenses 26 and the actuator 28. The controller 30 will convert the digital data into corresponding writing control commands, and transmit the writing control commands to the pickup head 22 in a data transmitting speed so as to write the writing control commands on the rotating CD 24. The writing speed in which the pickup head 22 writes digital data on the CD 24 is affected by the data transmitting speed of the controller 30 and the rotating speed of the spindle motor module 32. The data transmitting speed is higher than the rotating speed, and the writing speed is confined by the rotating speed.

The rotating speed of the spindle motor module 32 is a constant value. As the pickup head 22 rotates to the outer part of the CD 24, the rotating radius will increase. When the radius is increasing as the rotating angle is still the same, the recording units increase correlates with moving outer. The controller 30 can increase its data transmitting speed as the recording units increases to make the data transmitting speed higher than the rotating speed. Therefore the writing speed is confined by the rotating speed.

The writing speed in which the pickup head 22 writes digital data on the outer area in the CD 24 is higher than the writing speed in which the pickup head 22 writes digital data on the inner area in the CD 24. Considering that the radius of the most outer radius is 3 times than the most inner radius, the speed in which the CD drive 20 records/reads the most outer circle of the CD 24 is 3 times more than the speed in which the CD drive 20 records/reads the most inner circle of the CD 24.

Figure 4:
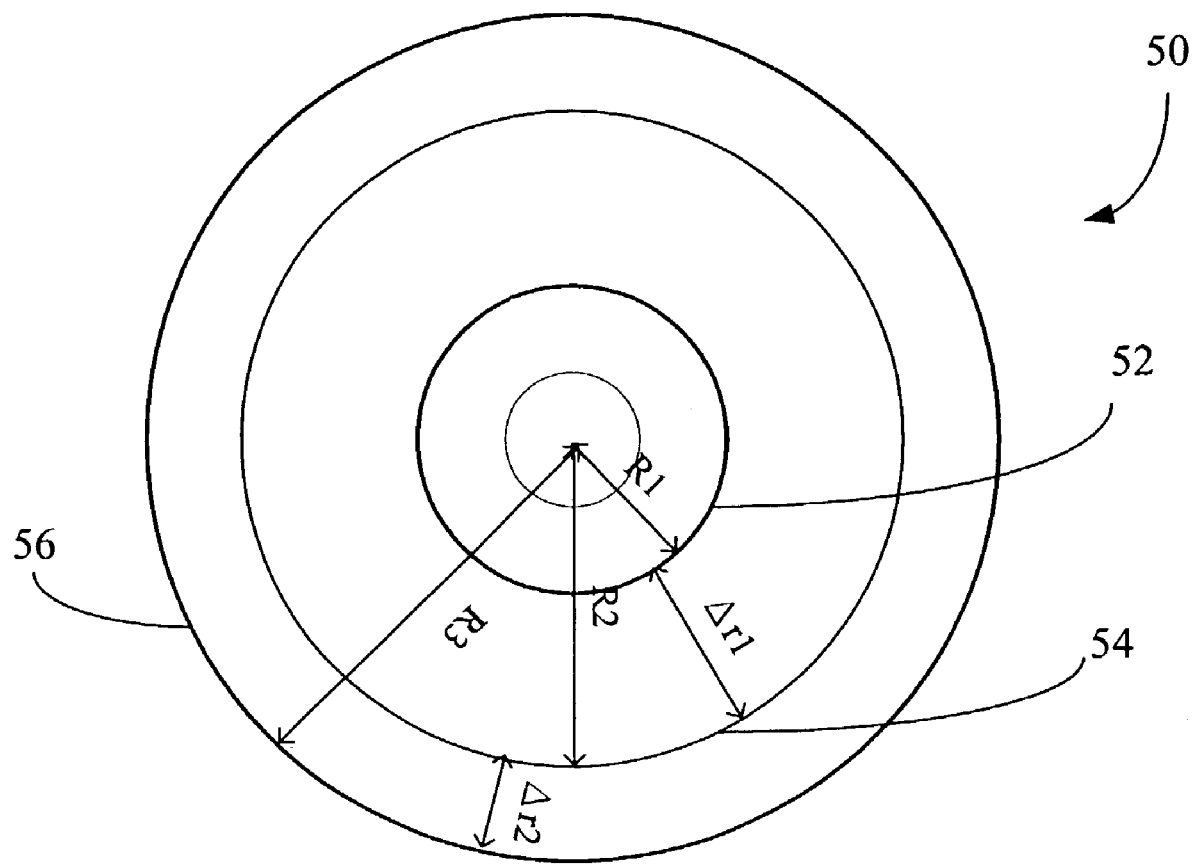
FIG. 4 shows a CD to explain the difference between the method of this invention and the prior art.

Please refer to FIG. 4. FIG. 4 shows a CD 50 to explain the difference between the method of this invention and the prior art. An instance using a known CD 50 to record a digital information file of 325 MB is introduced to explain how the invention accelerate the recording speed of the CD drive 20. The capacity of the CD 50 is 650 MB and a digital information file desired is 325 MB that is half of the capacity of the CD 50.

Conventionally, it is necessary to start recording from the most inner circle 52 of the CD 50 to the middle part 54 of the CD 50. The most inner circle 52 has a radius R1 of 2 centimeter and the most outer circle 56 has a radius R3 of 6 centimeter. The middle part 54 has a radius R2 of 4.472 centimeter. The difference ($\Delta r1$) between the radius R1 and the radius R2 is 2.742 centimeter. In this invention, first count the number of the digital data in the digital information file. Then according to the number counted, count forward from the last recording unit, the last Absolute Time in Pregroove (ATIP), in the most outer circle 56 of the CD 50 to get the best start recording unit which is the best ATEP to start in the middle part 54 of the CD 50 where the radius R2 is 4.472. Start to outward record the digital information file on the CD 50 from the middle part 54 to the most outer circle 56. The most outer circle 56 has a radius R3 of 6 centimeter. The difference ($\Delta r2$) between the radius R2 and the radius R3 is 1.528 centimeter. Compared with the prior art, $\Delta r1$ of the prior art is 1.618 times of $\Delta r2$ of this invention. Since the rotating speed of the pickup head 22 is the same, the time that a CD drive need to record an information file is correlated to the difference of the radiuses. That is, the time that the prior art needs to record the same file as this invention do is 1.618 times more than the time that this invention needs. Therefore, using this invention can accelerate substantially the recording speed of a CD drive.

In contrast to the conventional method which starts recording from the most inner circle of an information recording medium, the information recording method of this invention starts recording a digital information file on the information recording medium from a second start recording unit derived from a predetermined counting procedure. This can effectively accelerate the recording speed of the current information recording device.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An information recording method to record a digital information file onto an information recording medium, said digital information file comprising a plurality of digital data, said information recording medium comprising a plurality of predetermined recording units which are arranged sequentially on said information recording medium from an inner area to an outer area in order to write the plurality of digital data in the digital information file; said inner area of the information recording medium having a data recording start area, said data recording start area comprising a first start recording unit, where recording the plurality of digital data of digital information file supposed to start, the information recording method comprising the following steps of:
   (a) starting from said first start recording unit to derive a second start recording unit through a predetermined counting procedure; and
   (b) starting from said second start recording unit rather than from said first start recording unit to write said digital data onto said information recording medium; wherein the plurality of recording units of the information recording medium are enough to write all the digital data of said digital information file and there are at least one recording unit between said second start recording unit and said first start recording unit.

2. The information recording method of claim 1, wherein said outer area of said information recording medium comprises a last recording unit, and said predetermined counting procedure comprising the following steps of:
   counting the number of said digital data in said digital information file; and
   according to the number of said digital data, counting forward from said last recording unit to get said second start recording unit, thus all the digital data comprising in said digital information file can be written.

3. The information recording method of claim 1, wherein said predetermined counting procedure is to set an interval unit number, thus a recording unit which distance said interval unit number from said first start recording unit is said second start recording unit.

4. The information recording method of claim 1, wherein before executing the step (b), said data recording method will write a blank information file between said second start recording unit and said first start recording unit.

5. The information recording method of claim 4, wherein said inner area in said information recording medium store a File Allocation Table (FAT), and after executing step (b), said information recording method will write associated information of said blank information file and of said digital information file onto said FAT, so as to correctly access said digital information file later.

6. The information recording method of claim 1, wherein said recording units are arranged on a plurality of circle shaped recording grooves to write said digital data.

7. The information recording method of claim 6, wherein said circle recording grooves are arranged in concentric way.

8. The information recording method of claim 1, wherein said recording units are arranged on a helical recording grooves to write said digital data.

9. The information recording method of claim 8, wherein said information recording method uses an information recording device to write said digital information file on said information recording medium.

10. The information recording method of claim 9, wherein said information recording device is electrically connected to a computer, said computer comprising a data reading/ writing software to control said information recording device recording or reading said digital data.

11. The information recording method of claim 9, wherein said information recording medium is a compact disc (CD) and said information recording device is a compact disc (CD) drive.

12. The information recording method of claim 11, wherein said CD drive comprises:
   a pickup head, used to emit a light beam and write said digital data onto said CD, and read said digital data from said CD;
   a set of optical lenses, used to focus the light beam emitted from said pickup head to said CD, and to focus the light beam reflected from said CD to said pickup head, said pickup head will receive the reflected light beam so as to facilitate later determination;
   an actuator, used to actuate said pickup head, said set of optical lenses and said CD to write or read said digital data; and
   a controller, used to control said pickup head, said set of optical lenses and said actuator.

13. The information recording method of claim 12, wherein said actuator comprises a spindle motor module to rotate said CD in a rotating speed, to let said pickup head write said digital data on said CD, and the writing speed in which said pickup head writes digital data on outer area in said CD is higher than the writing speed in which said pickup head writes digital data on inner area in said CD.

14. The information recording method of claim 13, wherein said controller will convert said digital data into corresponding writing control commands, and transmit said writing control commands to said pickup head in a data transmitting speed so as to write said writing control commands on the rotating CD.

15. The information recording method of claim 14, wherein the writing speed in which said pickup head writes said writing control commands on said CD is affected by said data transmitting speed and said rotating speed of said spindle motor.

16. The information recording method of claim 15, wherein said data transmitting speed is higher than said rotating speed, and said writing speed is confined by said rotating speed.

17. An optical recording device to record a digital information file onto an optical recording medium, said digital information file comprising a plurality of digital data, said optical recording medium comprising a plurality of predetermined recording units which are arranged sequentially from an inner area to an outer area in order to write the plurality of digital data in the digital information file; said outer area of said recording medium comprising a last recording unit, said inner area of the optical recording medium having a data recording start area, said data recording start area comprising a first start recording unit where recording the plurality of digital data of digital information file is supposed to start, said optical recording device starting from a second start recording unit rather than from said first start recording unit to record said digital data onto said optical recording medium, wherein said second start recording unit is derived through a predetermined counting procedure, wherein said predetermined counting procedure comprising the following steps of:
   determining the amount of said digital data in said digital information file; and
   according to the amount of said digital data, counting from said last recording unit to get said second start recording unit to allow all the digital data in said digital information file to be written.

* * * * *